United States Patent [19]
Wieczorek et al.

[11] Patent Number: 5,524,958
[45] Date of Patent: Jun. 11, 1996

[54] AUTOMOTIVE CUP HOLDER

[75] Inventors: Joseph P. Wieczorek, Madison Heights; Collin C. Brunckhorst, Lake Orion; Mark H. Davenport, Macomb; Eugene M. Halajian, Harrison Township, all of Mich.

[73] Assignee: Takata, Inc., Auburn Hills, Mich.

[21] Appl. No.: 394,392

[22] Filed: Feb. 24, 1995

[51] Int. Cl.⁶ .................................................. A47C 7/62
[52] U.S. Cl. ............................. 297/188.17; 297/411.32
[58] Field of Search ..................... 297/188.17, 188.16, 297/188.15, 188.14, 188.01, 188.21, 411.32, 411.3, 115; 248/311.2, 313, 315; 224/275, 281, 282; 211/71, 74, 77

[56] References Cited

U.S. PATENT DOCUMENTS

| 4,738,423 | 4/1988 | DiFilippo et al. | 248/311.2 |
|---|---|---|---|
| 4,783,037 | 11/1988 | Flowerday. | |
| 4,953,771 | 9/1990 | Fischer et al. | 297/188.17 X |
| 4,955,571 | 9/1990 | Lorence et al. | 248/311.2 |
| 4,981,277 | 1/1991 | Elwell | 248/311.2 |
| 5,060,899 | 10/1991 | Lorence et al. | |
| 5,072,989 | 12/1991 | Spykerman et al. | 297/188.16 |
| 5,171,061 | 12/1992 | Marcusen. | |
| 5,195,711 | 3/1993 | Miller et al. | |
| 5,246,269 | 9/1993 | DeBoer et al. | |
| 5,259,580 | 11/1993 | Anderson et al. | |
| 5,284,314 | 2/1994 | Misaras et al. | |
| 5,330,146 | 7/1994 | Spykerman | 297/188.17 X |

Primary Examiner—Milton Nelson, Jr.
Attorney, Agent, or Firm—Harness, Dickey & Pierce

[57] ABSTRACT

A cup holder assembly formed as part of a vehicle arm rest. The cup holder includes a slidable drawer mounted to a frame for movement between an extended position and a retracted position. A retaining arm is supported by the drawer and biased to pivot about a vertical axis between a use position and a stored position. The retaining arm has a retaining ring on one end which defines a container receiving aperture. The ring also includes a downwardly extending offset which is adapted to receive the handle of a container. The drawer additionally has an indentation defined in a lateral side edge and the indentation is located so as to correspond with and receive the offset when the retaining arm is in its stored position.

19 Claims, 3 Drawing Sheets

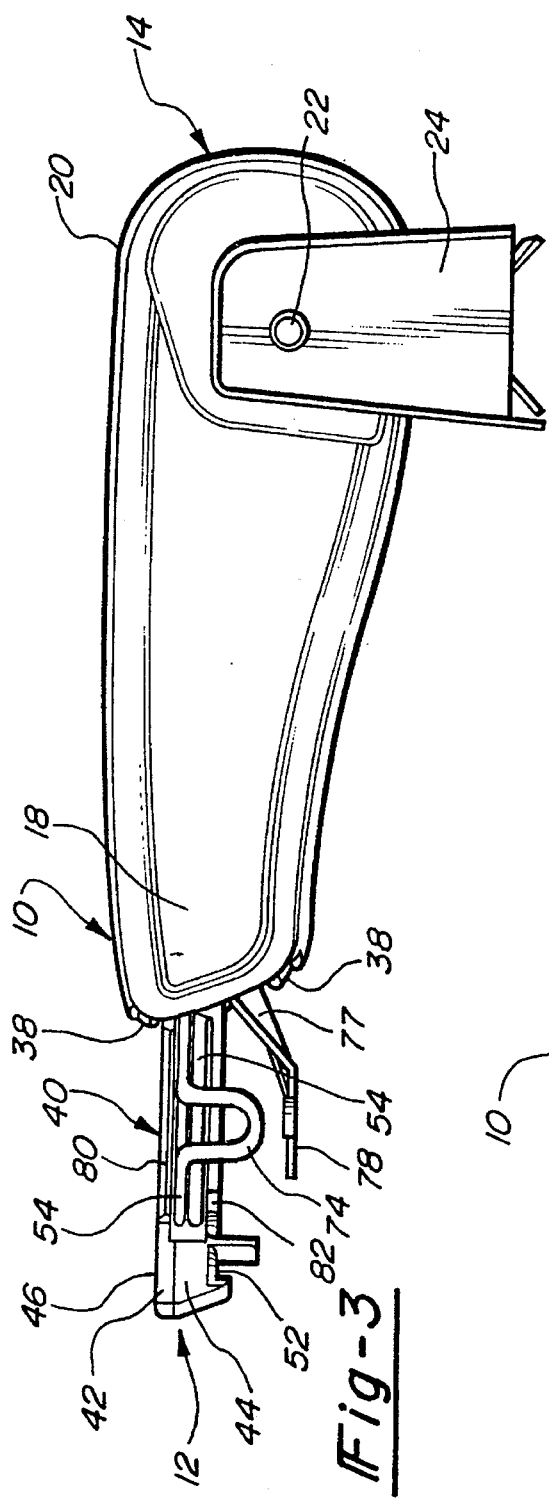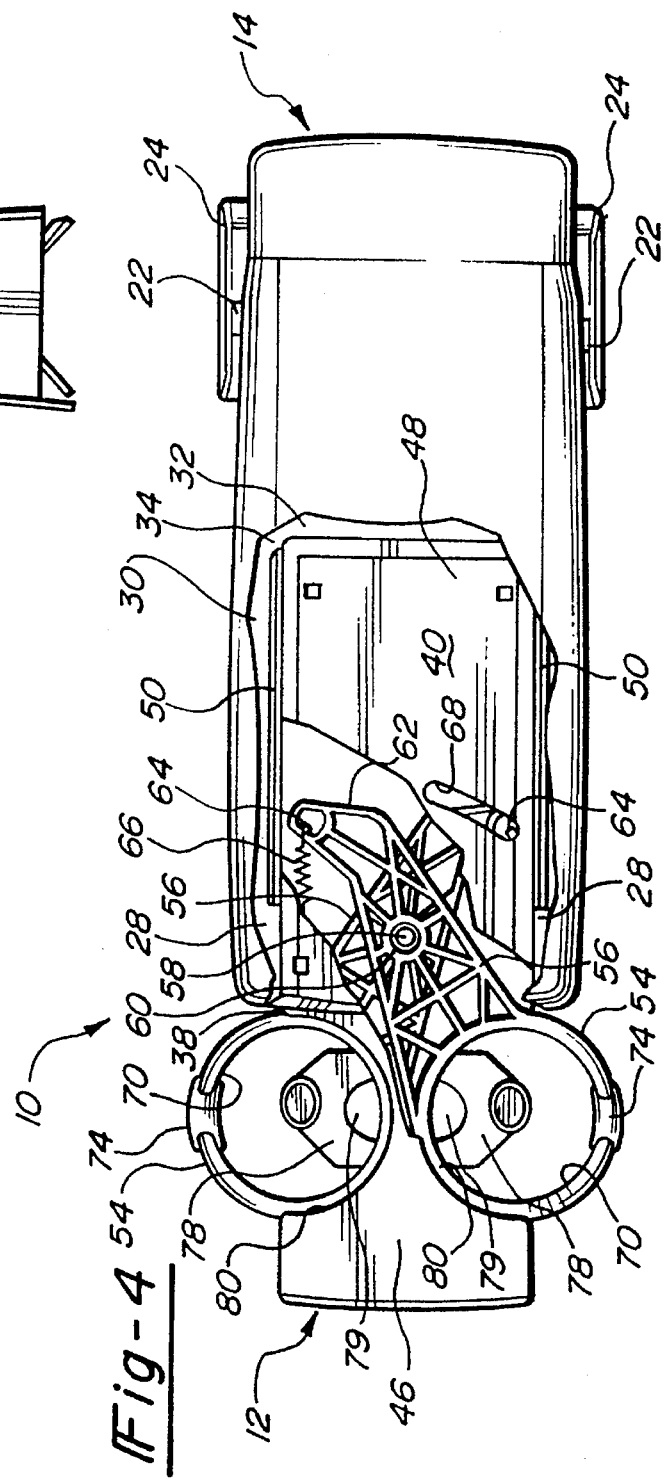

AUTOMOTIVE CUP HOLDER

BACKGROUND OF THE INVENTION

The present invention relates to an assembly for holding and supporting at least one beverage container within a vehicle. More particularly, this invention relates to an assembly integrally constructed with a vehicle arm rest and adapted to hold and support multiple beverage containers. Generally, these assemblies are known as cup holders.

When traveling in a motor vehicle, whether it is a short cross town commute or a trip of a longer duration, the occupants of the vehicle often find it enjoyable to consume a beverage while in route. For example, morning commuters often carry with them a hot beverage in a cup from the house or a convenient drive-thru service. At other times the beverage may be contained in a bottle or can. In all of these situations, while the vehicle is moving the container can be easily upset if it is placed on the dash, floor, seat or center console. For obvious reasons, it is desirable to provide a stable support or holder for beverage containers when they are used within a vehicle.

Over the years, a number of devices have been developed to prevent a beverage container from spilling its contents within a vehicle. One such device is known as the travel mug. Travel mugs generally come in two varieties, one of which has a narrow opening and a wide base and the other includes a lid and sometimes a flanged bottom which can be slid into a base mounted to the dash or center console of the vehicle. Both of these mechanisms have limitations in that they require the use of a dedicated container, exclusive of other containers. Since you must always have the travel mug in your car or with you to reap its benefits, these beverage containers can be inconvenient.

Another direction in which designers have moved has been to develop "generic" cup holders which can receive and support numerous types, styles and sizes of beverage containers. One of the first of these cup holders was a one-piece plastic "hanger" which included a downwardly extending tab that, during use, was positioned so as to extend into the window opening generally between the glass of the window and the interior of the door. These cup holders were rigid structures and of limited use because they were bulky, easily broken, and sometimes interfered with turning of the steering wheel or the opening of the door in certain vehicles. Cup holders have also been seen which fold down and generally operate as a tray on which the container can be placed.

Notwithstanding the above, original equipment manufacturers (OEMs) have been developing retractable cup holders which are mounted within the vehicle. One such cupholder includes a tray which is mounted for sliding movement into a recess in the dash board of the vehicle. The tray may include one or more fixed circular apertures into which the beverage container can be received. Another type of OEM cup holder includes a pivoting tray having one or more fixed circular apertures into which the beverage container can be received. These trays often pivot from a stored position to horizontal "use" position in response to the opening of a cover or door. The cover often operates as a rest for the bottom of a container received within the aperture of the tray.

As instrument panels have become increasingly crowded with electronic and ventilation equipment, cup holder trays with fixed circular apertures have fallen into disfavor. In an effort to reduce size, numerous assemblies have been developed where one or more retaining member forms less than a complete aperture into which the container is received. These retaining members often pivot with respect to a tray-type member which defines the remaining portion for the container receiving aperture. While being slightly more complicated in construction than fixed ring cup holders, these assemblies allow the cup holder to occupy less space when stored.

Another current trend is to relocate the cup holder assembly from the instrument panel to another portion of the vehicle. Because it is desirable to provide a compact cup holder which occupies a minimum amount of storage space, one location which has received considerable attention in the design of cup holders is the center console or fold down arm rest, respectively found in vehicles with bucket seats or split bench seats.

Generally, cup holders found in a center console or arm rest (hereinafter just arm rest) consist of one of two types. In the first of these types, the cup holder pivots about a horizontal axis from a stored position, located within the arm rest, into a use position where a beverage container can be received in it. Typically, this variety of cup holder is used where the arm rest also doubles as a center storage compartment and is provided with a hinged lid. The cup holder portion itself usually only occupies the forward end of the storage compartment.

The second type of arm rest cup holder utilizes a drawer which slides into a recess defined in the arm rest. In order to hold at least two containers whose combined width is greater than that of a standard sized arm rest, this type of cup holder must include some features which will allow those portions of the cup holder which actually define the container receiving apertures to occupy a reduced amount of space when stored in their non-use position. In accomplishing the above, cup holders have been proposed where each aperture which receives and holds a beverage container is defined in part by two elements, one of which is movable relative to the other.

Accordingly, one or more arms are provided so that they will laterally pivot relative to a drawer as the drawer is withdrawn from a recess in the arm rest. Generally these pivoting arms include a curved portion which cooperates with a curved recess in the drawer so that when the arms are fully extended a beverage container receiving aperture is generally defined by the two. One drawback with this type of design is that since the pivoting arms only define a portion of the beverage container receiving apertures, only one end of each pivoting arm is supported making the entire arm susceptible to instability problems. Another drawback is that these types of cup holders lack the ability to accept a beverage container having a handle, such as a coffee mug.

With the prior art in mind, it is an object of the present invention to provide a cup holder assembly which is mounted to slide within a recess defined in the vehicle. In particular, it is an object to provide a cup holder which is mounted to slide within a center console or arm rest, located between the driver and passenger seats of the vehicle.

Another object of this invention is to provide a cup holder in which the beverage container receiving aperture is wholly defined by a single element so as to offer a significant amount of stability to support a beverage container therein.

A further object of this invention is to provide a cup holder of the above mentioned variety wherein the container receiving aperture readily accepts beverage containers with handles, such as coffee mugs.

Yet another object of this invention is to provide a cup holder which will occupy a reduced amount of space when in either its stored or use position.

3

Still another object of this invention is to provide a cup holder assembly which is adapted to readily receive beverage containers exhibiting a wide variety of diameters and to support them in a stable manner.

SUMMARY OF THE INVENTION

In achieving the above and other objects, the present invention provides a drawer-type cup holder which is adapted to slide into and out of a recess defined in the arm rest of a vehicle. When in its stored position, the cup holder of the present invention is concealed within the vehicle's arm rest. When in use, the arm rest is in its down position and the drawer of the present invention is pulled toward the front of the vehicle, out of the storage recess. As it is being pulled out of the recess, a pair of arms pivot about a vertical axis each moving a ring element along an arcuate path until fully exposing a container receiving aperture defined by the ring element. In order for the arms and ring elements to occupy a minimum width when laterally extended, the drawer includes semi-circular recesses which generally correspond with the ring elements. The recesses do not, however, define the container receiving apertures. Rather, the recesses only operate to decrease the lateral distance which the ring elements arms must be moved in order to permit them to receive a beverage container therein.

As more fully discussed below, the ring elements include a "droop" or downwardly extending offset in their outboard portions. The offsets are configured to receive the handle of a coffee cup or similar beverage container and position the handles so that they are easily accessed by the vehicle occupants.

Pivotally mounted beneath the drawer is a container support or bail. The bail is located so that a portion of the bail will extends into the vertical cylinders defined by the container receiving apertures beneath the ring elements to support a beverage container received therein. A snubber is mounted to the drawer and extends into the vertical cylinder defined by the container receiving apertures. The snubber is formed of a resilient material and, as such, helps the cup holder assembly of the present invention to accommodate beverage containers of widely varying diameters.

When not in use, the cup holder assembly of this invention is pushed into the recess defined in the armrest. As it is pushed into the recess, the arms contact the lateral sides or edges of the recess and are biased toward the longitudinal centerline of the drawer. The two arms are vertically offset from one another so that when stored, one of the arms will partially overlap the other. The drawer itself is also provided with cut-out sections that are located to receive and accommodate the offsets in the ring elements. The cut-outs further enhance the storage compactness offered by the design of the present invention.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 3 is a side elevational view of the arm rest/cup holder seen in FIG. 1;

FIG. 4 is a top plan view with portions broken away of the arm rest/cup holder seen in FIG. 1 and illustrating the mechanism by which the arms pivot when moved into their use position.

DETAILED DESCRIPTION OF THE PREFERRED EMBODIMENT

Figure 1:
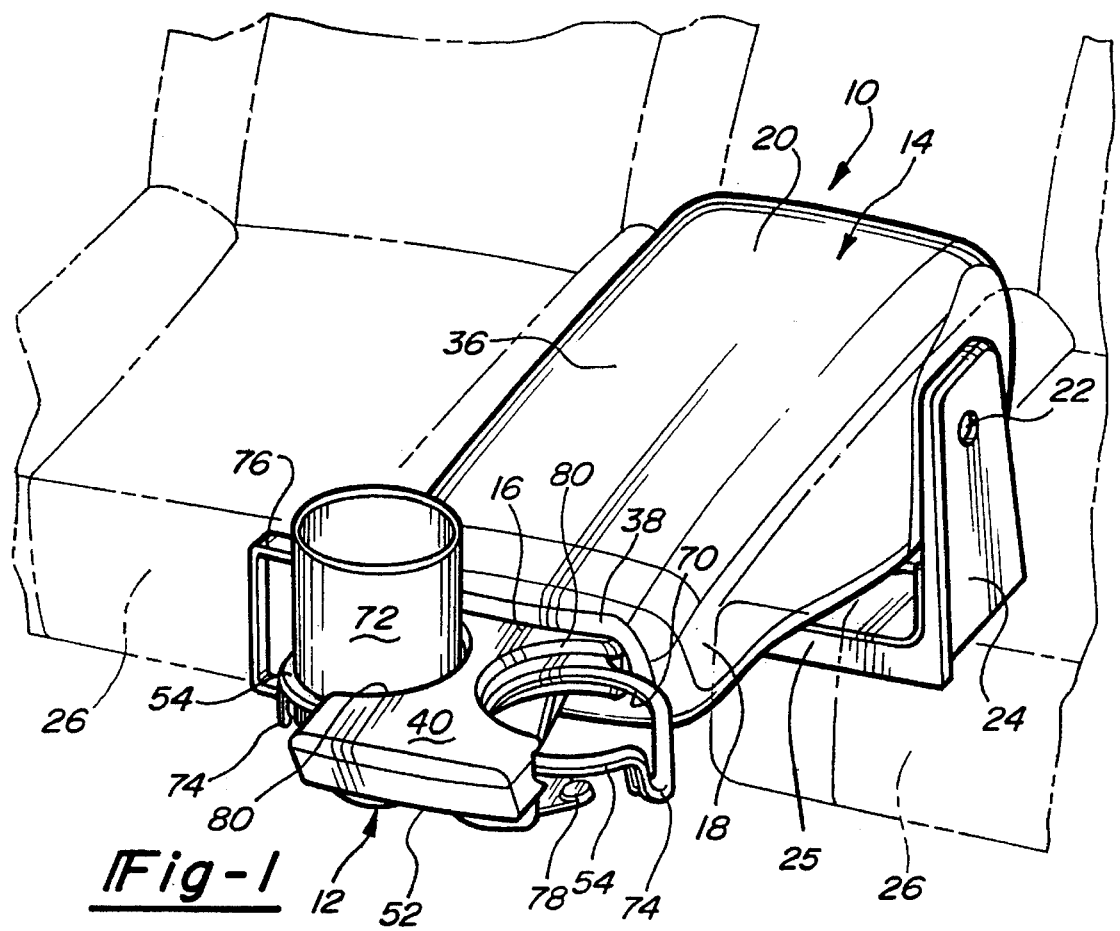
FIG. 1 is a perspective view of an arm rest/cup holder assembly embodying the principles of the present invention and illustrating the cup holder in its use position located between a pair of vehicle seats.

Referring now to the drawing, a cup holder assembly incorporating the principles of the present invention is generally illustrated in FIG. 1 and designated at 10. As seen in the preferred embodiment, the cup holder assembly 10 is principally composed of two portions, a cup holder portion 12 and an arm rest portion 14. While illustrated and articularly described in connection with a vehicle arm rest portion 14, it will be apparent that the cup holder portion 12 is also capable of being incorporated into other aspects of the vehicle. The invention should therefore not be interpreted as being limited only the arm rest portion 14 of a vehicle.

Figure 2:
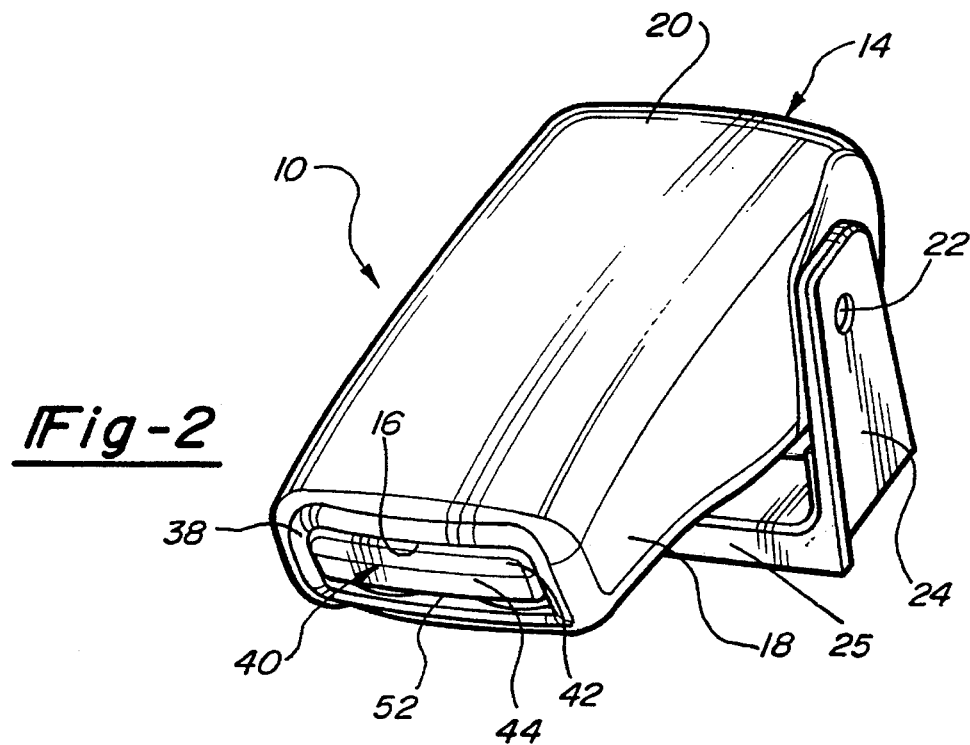
FIG. 2 is a perspective view of an arm rest/cup holder embodying the principles of the present invention with the cup holder portion shown in its stored or non-use position.

The cup holder portion 12 is integrally formed with the arm rest portion 14 for movement between an extended position, seen in FIG. 1, and a retracted position, seen in FIG. 2. In its retracted position, the cup holder portion 12 is substantially completely contained within the body of the arm rest portion 14. In its extended position, the cup holder portion 12 protrudes forward in the vehicle from a recess 16 defined in the arm rest portion 14.

At its rearward end 20, the arm rest portion 14 is pivotally mounted at 22 to a bracket 24 having a base 25 which is either secured to the seat frame or vehicle floor pan (not shown) so as to locate the assembly 10 between the sitting area of a pair of seats 26. In the figures, the assembly 10 is shown in a generally horizontal position such that the arm rest portion 14 can be utilized by the occupants of the vehicle. If desired, the assembly 10 can be pivoted about the pivotal mounting 22 into a substantially upright "non-use" position. Obviously, numerous substitute mounting mechanisms for the bracket 24 can be envisioned to locate the assembly 10 between the seats 26. The specific mounting mechanism will depend on the actual seat construction in the vehicle, and for this reason, it is not more fully discussed herein.

The arm rest portion 14 includes a hollow body defined by an upper substrate 28 and a lower substrate 30 which are mounted together through conventional methods. The substrates 28 and 30 can be formed from a variety of materials. Plastic, however, is preferred because of cost, weight and rigidity considerations. As suggested above, the substrates 28 and 30 cooperate to define a receiving cavity 32 within the body of the arm rest portion 14. A shelf or recessed groove 34 is defined on the lateral sides of the receiving cavity 32 by one of the substrates 28 or 30. As evident from the discussion which follows, this groove 34 cooperates to permit sliding movement of the cup holder portion 12 within the arm rest portion 14.

The upper and lower substrates 28 and 30 are respectively covered by an upper and lower foam bun (not shown) which may be separately provided or over molded onto the substrates 28 and 30. These, and the sidewalls 18 are in turn covered by a trim material 36 which provides the arm rest portion 14 with the desired aesthetic appeal. A bezel 38 defines the circumferential perimeter of the recess 16 and cooperates with the substrates 28 and 30 to secure the trim material 36 in that area.

As mentioned above, the cup holder portion 12 is received within the arm rest portion 14 to permit sliding movement. More specifically, the cup holder portion 12 includes a drawer 40 which itself is further comprised of an upper support 42 and a lower support 44. The upper and lower supports 42 and 44 are secured to one another through conventional methods, such as interlocking tabs or fingers, to form the drawer 40. As seen in FIG. 4, the drawer 40 includes an outboard portion 46, an inboard portion 48 and flanges 50 which define the lateral edges of the inboard portion 48. The flanges 50 extends into the groove 34 defined between the upper and lower substrates 28 and 30 so as to support the drawer 40 within the arm rest portion 14.

The outboard end of the drawer 40 includes a lip 52, defined in the lower support 44, which allows an occupant of the vehicle to grasp pull the drawer 40 from its stored position into an extended position where the cup holder portion 12 can be utilized.

When extended, a pair of spring elements 66 secured between the ends of a pair of pivot arms 56 and the drawer 40, generally laterally bias ring elements 54 on the opposing ends of the pivot arms 56 relative to the drawer 40. More precisely, the ring elements 54 are pivoted about an axle 58 which extends up through a common aperture 60 centrally defined in both of the pivot arms 56. The axle 58 is a portion of one or both of the upper and lower supports 42 and 44 of the drawer 40 and defines a vertical pivot axis about which the pivot arms 56 can rotate, similar in action to a set of scissors.

Opposite the ring elements 54, the pivot arms 56 extend beyond the axle 58 in extensions 62, each of which includes a boss 64 formed on its distal end and which extends into a slot 68 defined in the upper support 42 of the drawer 40. Each boss 64 operates as anchor for one end of a spring 66 that biases its respective ring elements 54 into its outboard position. The opposing ends of the springs 66 are secured to either the upper or lower supports 42 and 44 of the drawer 40. Lateral movement of the ring elements 54, as induced by the springs 66, is limited by the terminal ends of the extensions 62. The terminal ends of the extensions 62 will interferingly engage the interior sides of the drawer 40 during rotation of the arms 56 thereby limiting the lateral extent to which the ring elements 54 can be moved.

The ring elements 54 are generally circular in shape and wholly define a container receiving aperture 70 into which a beverage container 72, such as a coffee cup, can be received. A "droop" or vertical offset 74 is unitarily formed in each ring element 54 so as to accommodate a handle 76 on the beverage container 72, if so provided with one. Previously, cup holder assemblies tended to ignore the possibility that a beverage container with a handle would be utilized in connection with the cup holder. As a result, these beverage containers were either not used in the cup holders or were "tilted" when received therein. In the present invention, the vertical offsets 74 eliminate this problem and are located on the ring element 54 so that convenient access by an occupant of the vehicle to the beverage container is permitted.

When a container is placed within the container receiving aperture 70 defined by the ring elements 54, the container 72 will rest upon and be supported by a container support or bail 78. The bail 78 is pivotally mounted via an arm 77 to the bottom of the lower support 44 of the drawer 40 and, when the cup holder portion 12 is in its extended position, the bail 78 drops beneath the drawer 40 into a position generally in registry within the vertical cylinders defined by the container receiving apertures 70 as seen in FIG. 4. Additionally, a snubber 79 formed from a resilient, preferably closed cell foam material, is mounted to the drawer 40 (between the upper and lower supports 42 and 44) so as to also extend into the container receiving apertures 70. The snubber 79 operates to accommodate beverage containers 72 which exhibit a diameter which is substantially less than that of the container receiving apertures 70. Thus, the snubber 79 "snugs-up" the fit between the beverage container 72 and the ring elements 54 preventing the beverage container 72 from sliding around within the container receiving aperture 70 when the vehicle is moving.

The drawer 40 is also formed with two semi-circular recesses 80 which generally cooperate with the ring elements 54 when they are in their use position. The recesses 80 do not help to define the container receiving apertures 70. Rather, by incorporating the recesses 80 into the drawer 40, the lateral distance which the ring elements 54 must be moved by the pivot arms 56 to accept a container 72 is decreased further providing the cup holder portion 12 with a more compact width and design while in use.

Figure 5:
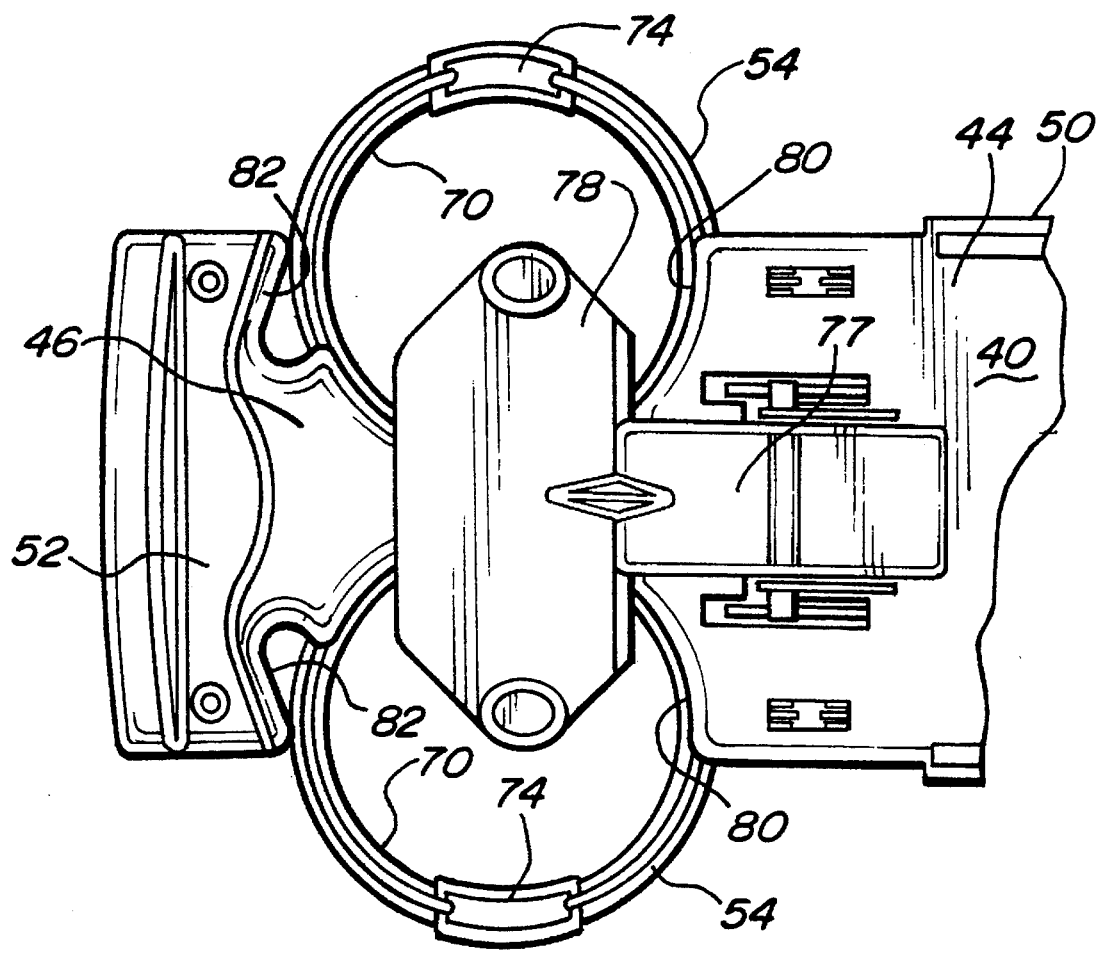
FIG. 5 is a view of the arm rest mounted cup holder illustrated in FIG. 1.

As seen in FIG. 4, the recesses 80 and the upper support 42 of the drawer are substantially semi-circular in shape. However, as seen in FIG. 5, the recesses defined in the lower support 44 of the drawer 40 are provided with a cut-out 82 toward the outboard portion 46. The cut-outs 82 serve to receive the vertical offsets 74 when the cup holder portion 12 is in its stored position within the arm rest portion 14.

Accordingly, when the cup holder portion 12 is stored or moved within the arm rest portion 14, the drawer 40 will be guided by the flanges 50 located within the grooves 34. After a minimal amount of insertion, the ring elements 54 will contact the bezel 38 and be forced inwardly towards the center of the drawer 40 as further insertion commences. Since the pivot arms 56 are vertically stacked on the axle 58 with respect to each other, the ring elements 54 themselves are vertically positioned so that they will not interfere with each other and will, instead, partially overlap one another. When within the cavity 32 in the arm rest 14, the outward biasing of the ring elements 54 by the springs 66 causes the ring elements 54 to engage the interior sides of the substrates 28 and 30. This as well as other inherent friction in the construction, operates to keep the drawer 40 retained within the arm rest 14 when desired. Also during movement of the drawer 40 into the arm rest portion 14, the arm 77 of the bail 78 engages the bottom portion of the bezel 38 pivoting upward toward the lower support of the drawer 40.

Once the cup holder portion 12 is substantially within the arm rest portion 14, it can be seen that the arcuate path followed by the ring elements 54 will cause the vertical offsets 74 to be located in the cut-outs 82. In this manner, the cup holder assembly 10 of the present invention is provided with an extremely compact design when both in use and when not in use. Yet, the assembly 10 is capable of accepting large diameter beverage containers 72, especially those having handles 76.

While the above description constitutes the preferred embodiment of the present invention, it will be appreciated that the invention is susceptible to modification, variation and change without departing from the proper scope and fair meaning of the accompanying claims.

We claim:

1. A retractable cup holder assembly for mounting in a vehicle to support at least one beverage container, said cup holder assembly comprising:

a frame adapted to be fixedly mounted within the vehicle;

a support member mounted to said frame for movement with respect to said frame between an extended position and a retracted position;

at least one retaining member supported by said support member for movement therewith, said retaining member being mounted to said support member for movement between a use position and a stored position, said retaining member including an arm having a continuous circumferential retaining ring at one end, said ring defining an aperture of a size into which a beverage container can be received and having an offset portion formed therewith and generally extending away from remaining portions of said ring, said offset portion adapted to receive the handle of a container therein; and biasing means for biasing said retaining member into said use position when said support member is in said extended position.

2. A cup holder assembly as set forth in claim 1 further comprising a container support mounted to said support member and positioned below said ring to be at least partially in registry with said aperture.

3. A cup holder assembly as set forth in claim 1 wherein said ring is mounted for movement such that said ring is laterally movable relative to said support member.

4. A cup holder assembly as set forth in claim 1 wherein said offset portion forms a downward extension having an upwardly facing concavity.

5. A cup holder assembly as set forth in claim 1 wherein said support member includes an upper surface and a lower surface, said retaining member being substantially contained between said upper and lower surfaces when in said stored position.

6. A cup holder assembly as set forth in claim 1 wherein said cup holder assembly is adapted to be mounted within a recess in the vehicle.

7. A cup holder assembly as set forth in claim 1 further comprising snubber means for enabling said retaining member to securely retain therein beverage containers having diameters which are less than the diameter of said aperture.

8. A cup holder assembly as set forth in claim 7 wherein said snubber means is mounted to said support member and extends in partial registry with said aperture.

9. A cup holder assembly as set forth in claim 7 wherein said snubber means is made of a resilient material and is cantileverly secured to said support member.

10. A cup holder assembly as set forth in claim 1 wherein said retaining member is mounted for pivotal movement about an axis.

11. A cup holder assembly as set forth in claim 10 wherein said axis is substantially vertical.

12. A cup holder assembly as set forth in claim 1 wherein said arm includes a first portion and a second portion generally located on opposing sides of a vertical axis about which said arm pivots, said first portion being integrally connected to said ring and said second portion being connected to said biasing means.

13. A cup holder assembly as set forth in claim 12 wherein said biasing means is a tension spring.

14. A cup holder assembly as set forth in claim 1 further comprising stop means for limiting the extent to which said ring moves when in said use position, said stop means including an interfering engagement between a portion of said arm and a portion of said support member.

15. A cup holder assembly as set forth in claim 14 wherein said recess is within an arm rest within the vehicle.

16. A retractable cup holder assembly for mounting in a vehicle to support at least one beverage container, said cup holder assembly comprising:

a frame adapted to be fixedly mounted within the vehicle;

a support member mounted to said frame for movement with respect to said frame between an extended position and a retracted position;

at least one retaining member supported by said support member for movement therewith, said retaining member being mounted to said support member for movement between a use position and a stored position, said member including an arm having a continuous circumferential retaining ring at one end, said ring defining an aperture of a size into which a beverage container can be received and having an offset portion formed therein and adapted to receive the handle of a container therein;

biasing means for biasing said retaining member into said use position when said support member is in said extended position;

offset receiving means defined in said support member and located so as to correspond with and receive therein said offset portion when said retaining member is in said stored position, said offset receiving means including a notch formed in said support member and located to correspond with said offset portion when said retaining member is in said stored position.

17. A cup holder assembly as set forth in claim 16 wherein said support member includes an upper surface and a lower surface, said notch being defined in a lateral side edge of said lower surface.

18. A cup holder assembly as set forth in claim 17 wherein said support member further includes at least one arcuate recess defined in a lateral side edge thereof, said notch being formed in said arcuate recess.

19. A cup holder assembly mounted within a recess defined in an arm rest of a motor vehicle, said cup holder assembly adapted to supporting a pair of beverage containers and comprising:

a frame fixedly mounted to the arm rest within the recess;

a drawer member having an upper surface, a lower surface, an outboard portion and an inboard portion, said inboard portion having lateral sides adapted to be engaged within said frame thereby mounting said drawer member to said frame for sliding, generally axial movement between an extended position where said drawer member is at least partially extended out of said recess and a retracted position where said drawer member is located within the recess, said outboard portion having lateral sides each including a portion defining an arcuate recess in said upper and lower surfaces, said recesses defined in said lower surfaces further including a notch formed therein;

a pair of container retaining members supported by said drawer member for movement therewith, said retaining members positioned between said upper and lower surfaces and mounted for pivotal movement about a common upright axis through said drawer, said pivotal movement being between a use position and a stored position, said retaining members each including an arm having first and second ends located on opposite sides of said axis, said first end including a circumferentially continuous ring defining a container receiving aperture of a size adapted to receive a beverage container therein, said ring further including a downwardly extending offset adapted to receive a handle of a container received in said ring, said ring being laterally pivotable outward along an arcuate path relative to said drawer when moved into said use position, said ring being substantially contained within said drawer between said upper and lower surfaces with said offset being received within said notch formed in said lower surface of said drawer member when in said stored position; and biasing means for biasing said retaining members into said use position when said drawer member is extended, said biasing means including a tension spring having one of its ends attached to said drawer and its other of its ends attached to said second end of said arm.

* * * * *